United States Patent
Larkin, Jr.

[15] 3,660,159
[45] May 2, 1972

[54] METHOD FOR METERING A CLEANING SOLUTION FOR A VEHICLE WHEEL

[72] Inventor: Clyde F. Larkin, Jr., 285 Taylor Drive, Lexington, Ky. 40505

[22] Filed: Nov. 30, 1970

[21] Appl. No.: 93,523

Related U.S. Application Data

[62] Division of Ser. No. 763,067, Sept. 27, 1968, Pat. No. 3,602,236.

[52] U.S. Cl. .............................................. 134/32, 134/123
[51] Int. Cl. ........................................................ B08b 3/04
[58] Field of Search .................... 134/32, 45, 123; 15/DIG. 2

[56] References Cited

UNITED STATES PATENTS 3,258,019  6/1966  Bellas et al. .......................... 134/123 X
3,419,022  12/1968  Youngren, Sr. et al. .................. 134/45

FOREIGN PATENTS OR APPLICATIONS 1,023,552  3/1966  Great Britain .......................... 134/123

Primary Examiner—Morris O. Wolk
Assistant Examiner—Joseph T. Zatarga
Attorney—Frank C. Leach, Jr.

[57] ABSTRACT

Linearly spaced spray nozzles are disposed on opposite sides of a vehicle path for spraying a cleaning solution on the wheels of a vehicle. As the vehicle wheel engages a trip mechanism for each pair of aligned nozzles, a portion of the area of the wheel is sprayed with the cleaning solution. A predetermined quantity of the cleaning solution is metered through each of the spray nozzles irrespective of the time that the wheel remains in engagement with the trip mechanism.

10 Claims, 4 Drawing Figures

PATENTED MAY 2 1972

INVENTOR
CLYDE F. LARKIN, JR.

BY   *Frank C. Leach jr.*

ATTORNEY.

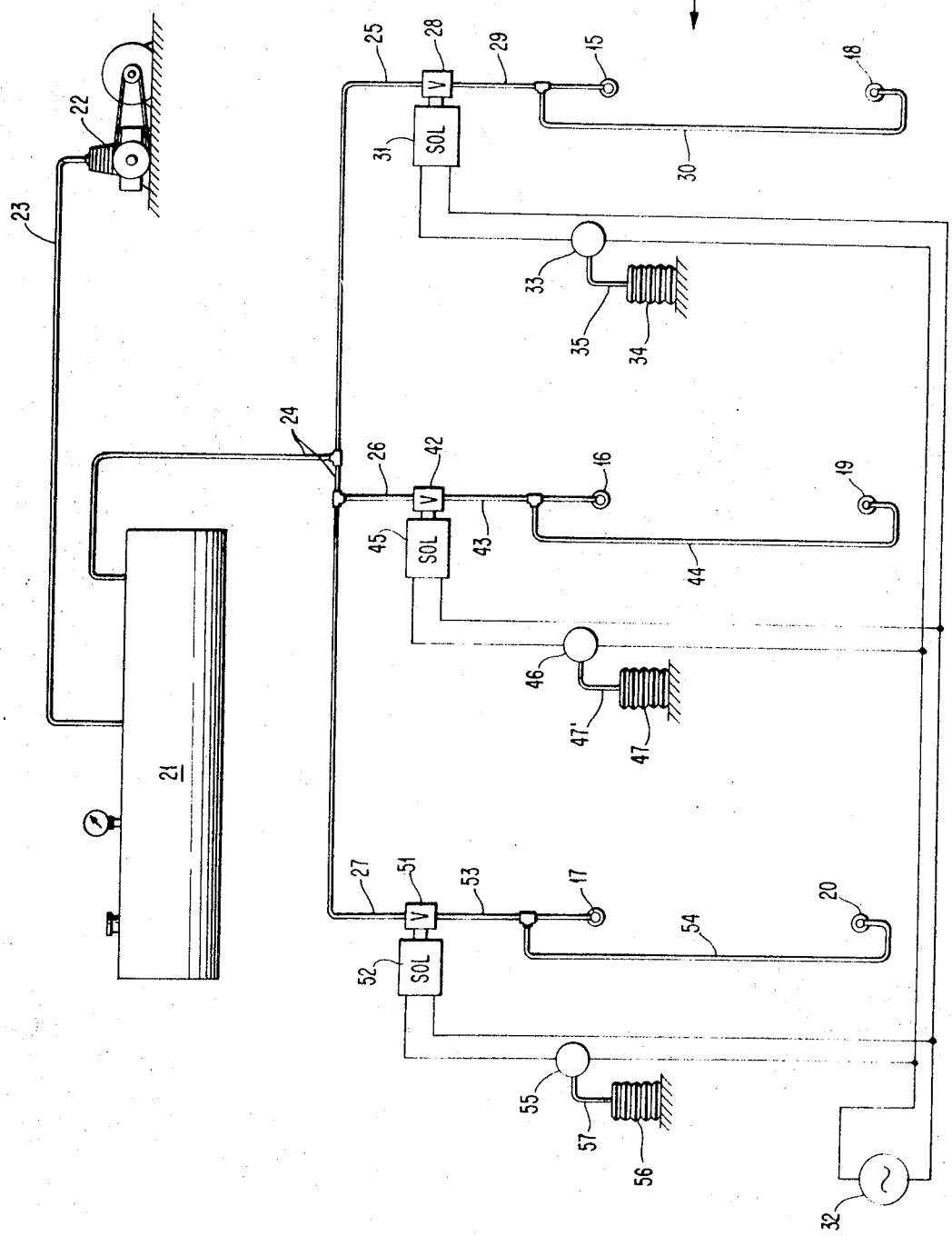

METHOD FOR METERING A CLEANING SOLUTION FOR A VEHICLE WHEEL

This is a division of application Ser. No. 763,067, filed Sept. 27, 1968, now U.S. Pat. No. 3,602,236 dated Aug. 31, 1971.

In one type of automatic vehicle washing apparatus, the vehicle is advanced into a specified area where the vehicle is stopped and the washing apparatus, which may comprise spray nozzles and/or brushes, it moved relative to the fixed vehicle. While this type of vehicle washing apparatus satisfactorily cleans the body of the vehicle, the cleaning of the wheels of the vehicle has not been satisfactorily.

If water with a cleaning solution is merely sprayed on the wheels, it is not capable of removing the grime from the wheel in all instances. If brushes are utilized to clean the vehicle wheels, the various fender well designs limit the area into which the brush may be disposed since the apparatus must be capable of washing all types of vehicles. Therefore, while automatic vehicle washing apparatus in which the vehicle is stationary and the washing apparatus moves relative thereto satisfactorily clean the body of the vehicle, the wheels of the vehicle are still not completely clean.

The present invention satisfactorily solves the foregoing problem by applying a cleaning solution to the vehicle wheels before the vehicle is advanced into the area in which it remains stationary while the spray nozzles and/or brushes move relative to the vehicle to wash the body of the vehicle. By applying the cleaning solution before the spray nozzles apply water thereto and/or the brushes engage the wheels of the vehicle, the cleaning solution will have sufficient time to act on the grime on the vehicle wheels to loosen the grime sufficiently for it to be easily removed by water from spray nozzles, for example. Thus, when using the present invention, it is not necessary to utilize any type of a brush to remove grime from the vehicle wheels.

While U.S. Pat. No. 3,346,895 to Consolo has previously suggested the utilization of linearly spaced spray nozzles to apply a cleaning solution to a vehicle wheel, the apparatus of the aforesaid Consolo patent employs a brush, which engages the vehicle wheel during its entire travel past all of the spray nozzles. Thus, there is no period of time during which the cleaning solution of the aforesaid Consolo patent may remain on the vehicle wheel before it is removed therefrom. Accordingly, the aforesaid Consolo patent primarily relies upon the force of the brushes to remove the grime from the vehicle wheels and not on the cleaning solution.

In the aforesaid Consolo patent, each of the linearly spaced spray nozzles is actuated through engagement of a trip mechanism by the vehicle wheel. As long as the vehicle wheel remains in engagement with the trip mechanism, the apparatus of the aforesaid Consolo patent will continue to supply cleaning solution through the spray nozzle, which is activated by the trip mechanism.

Accordingly, while the apparatus of the aforesaid Consolo patent would function satisfactorily where a vehicle could be continuously advanced therethrough such as in the type of vehicle wash apparatus in which a vehicle is pulled by a chain through the washing apparatus, the apparatus of the aforesaid Consolo patent is not satisfactorily where the vehicle cannot move continuously past the wheel washing apparatus.

In automatic vehicle washing apparatuses of the type in which the vehicle is stationary while spray nozzles and/or brushes move relative thereto, the vehicles are not capable of moving continuously. Thus, if the apparatus of the aforesaid Consolo patent were utilized with this type of vehicle washing apparatus, a very large quantity of cleaning solution would be employed due to a vehicle wheel resting on one of the trip mechanisms and allowing the cleaning solution to be continuously supplied through the spray nozzle associated with the trip mechanism engaged by the wheel. This would render the apparatus of the aforesaid Consolo patent economically unfeasible for use with any type of vehicle washing apparatus in which the movement of the vehicle is not controlled so as to be continuously movable.

As an example, the present invention meters the fluid through each spray nozzle for one-tenth of a second. Since there are three spray nozzles on each side of the vehicle path and there are two wheels passing each of the spray nozzles, a total of twelve squirts of the cleaning solution is applied to the four vehicle wheels at a cost of approximately one cent per vehicle. However, if a vehicle should sit on one of the spray nozzle activating means for one minute and there were no metering means to stop the supply of the cleaning solution, the cost would be 1 dollar. This would be prohibitive since the usual charge for a complete vehicle wash is less than 1 dollar.

The present invention satisfactorily solves the foregoing problem by metering the quantity of the cleaning solution supplied to each of the vehicle wheels as it passes each of the linearly spaced spray nozzles. In the present invention, a predetermined quantity of the cleaning solution is supplied through each of the spray nozzles when the wheel reaches the position in which a particular spray nozzle may direct the cleaning solution to a portion of the area of the vehicle wheel. In the present invention, no further cleaning solution can be supplied by the particular spray nozzle irrespective of the length of time that the vehicle wheel remains in the same position so as to continue to be engaged against the spray nozzle activating means, which activates a control means for supplying the cleaning solution through the spray nozzle.

An object of this invention is to provide a method for controlling the quantity of cleaning solution supplied to vehicle wheels.

Other objects of this invention will be readily perceived from the following description, claims, and drawings.

The attached drawings illustrate a preferred embodiment of the invention in which:

FIG. 4 is a schematic diagram of the system of the present invention for supplying the cleaning solution.

Figure 1:
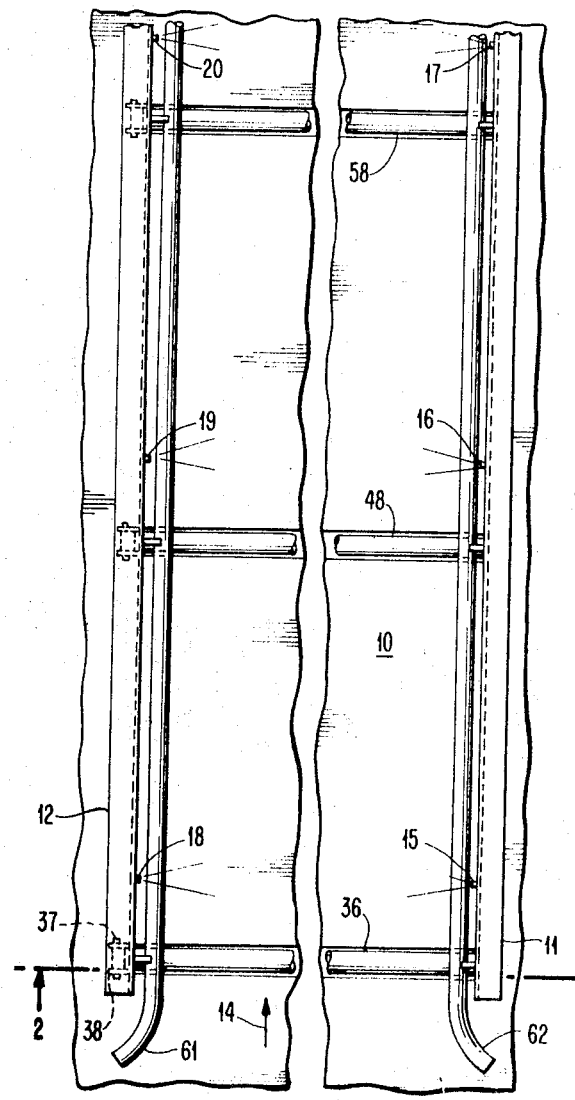
FIG. 1 is a top plan view of the apparatus of the present invention.
Figure 2:
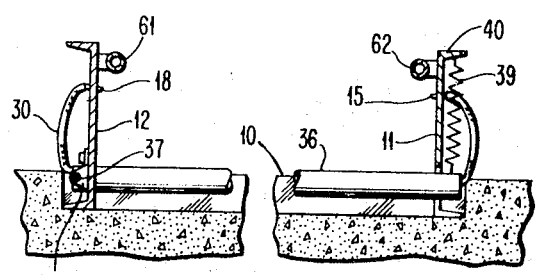
FIG. 2 is a sectional view of the apparatus of FIG. 1 and taken along line 2—2 of FIG. 1.
Figure 3:
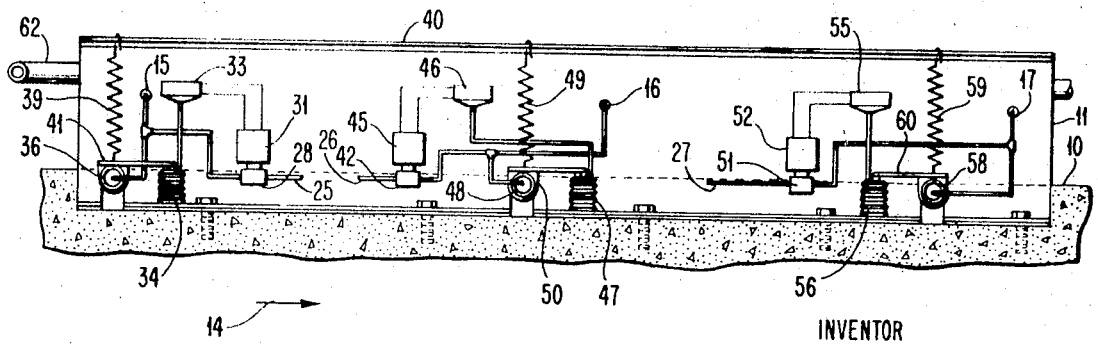
FIG. 3 is a side elevational view of the apparatus of FIG. 1.

Referring to the drawings and particularly FIGS. 1-3, there is shown a road bed 10 having a pair of channels 11 and 12 supported thereby. The channels 11 and 12 are spaced sufficiently apart such as 9 feet, for example, to accommodate vehicles for movement therebetween in the direction indicated by arrow 14.

The channel 11 has three linearly spaced spray nozzles 15-17 supported thereby. The channel 12 has three similarly linearly spaced spray nozzles 18-20 supported thereby and preferably disposed in aligned relation with the nozzles 15-17. Thus, the nozzles 15 and 18 are aligned with each other, the nozzles 16 and 19 are aligned with each other, and the nozzles 17 and 20 are aligned with each other.

The linear spacing between the nozzles is selected so that each of the spray nozzles directs a cleaning solution on a portion of the area of the vehicle wheel, which is advancing past the spray nozzle, separate from the portions of the wheel area on which the other two of the three nozzles on either of the channels 11 and 12 direct the cleaning solution. Thus, the three spray nozzles 15-17 cooperate to spray the entire area of vehicle wheel, which moves adjacent thereto, while the nozzles 18-20 cooperate to spray a cleaning solution on the entire area of the vehicle wheel, which is passing adjacent the nozzles 18-20. One suitable example of the distance between the adjacent nozzles is 26 inches.

The nozzles 15-20 are connected to a tank 21 (see FIG. 4), which has the cleaning solution stored therein. The tank 21 is maintained under a suitable pressure such as 45 to 55 p.s.i.g., for example, by an air compressor 22. The air compressor 22 is connected to the top of the tank 21 by a conduit 23.

The solution is supplied from the tank 21 to the nozzles 15-20 by main pipe 24 and branch pipes 25, 26, and 27. The main pipe 24 and the branch pipes 25-27 are preferably enclosed within a hollow tube formed of a suitable plastic material such as polyvinyl chloride, for example. The pipes 24–27 are surrounded by an electric tape, which is disposed within the hollow tube, to heat the cleaning solution passing through the main pipe 24 and the branch pipes 25–27. This prevents any freezing of the cleaning solution during operations when low atmospheric temperatures exist.

The nozzles 15 and 18 are connected to the branch pipe 25 through a valve 28. A hollow tube 29 extends from the valve 28 to the nozzle 15 while a hollow tube 30 extends from the tube 29 to the nozzle 18. Accordingly, cleaning solution is supplied through the spray nozzles 15 and 18 only when the valve 28 is opened.

The valve 28 is opened only when a solenoid 31, which is connected to the valve 29, is energized from an AC voltage source 32. The solenoid 31 is energized from the AC source 32 only when a pneumatic switch 33, which is in one of the lines connecting the AC source 32 to the solenoid 31, is closed. The pneumatic switch 33 closes only when it is subjected to pressurized air.

A bellows 34 is connected by a pipe 35 to the pneumatic switch 33 to supply pressurized air thereto when the bellows 34 is compressed. However, the bellows 34 can supply only one shot of pressurized air through the pipe 35 to the pneumatic switch 33 when the bellows 34 is compressed. Accordingly, the pneumatic switch 33 remains energized only as long as the pressurized air from the bellows 34 acts thereon. This ceases in a very short period of time so that the solenoid 31 is energized only for a very short period of time such as one-tenth of a second, for example.

When the bellows 34 is compressed, the cleaning solution is supplied through both of the spray nozzles 15 and 18 to set on the wheels of the vehicle, which are advancing along the path as indicated by the arrow 14. The spray nozzle 15 applies the cleaning solution to the right wheel while the spray nozzle 18 directs the cleaning solution to the left wheel.

The bellows 35 is compressed when an activating or trip member 36, which may be a hollow pipe, for example, is moved downwardly by one of the wheels of the vehicle engaging the member 36. As shown in FIG. 2, one end of the member 36 is pivotally connected to the channel 12 through a pin 37 cooperating with a support bracket 38, which is fixed to the channel 12.

The other end of the activating or trip member 36 is connected to one end of a spring 39, which has its other end attached to a flange 40 of the channel 11. The spring 39 continuously urges the member 36 counterclockwise (as viewed in FIG. 2) about the axis of the pin 37 so that the member 36 is disposed above the road bed 10 and adapted to be engaged by the wheels of the vehicle during movement of the vehicle along the path indicated by the arrow 14.

The member 36 has a bracket 14 fixed thereto with one end bearing against the bellows 34. Accordingly, when the member 36 is moved downwardly against the force of the spring 39 due to the vehicle wheels whereby the presence of the vehicle wheels is sensed, the bracket 41 compresses the bellows 34 to supply pressurized air to the pneumatic switch 33 and cause closing thereof.

When this occurs, the solenoid 31 is energized to open the valve 28 to supply the cleaning solution under pressure to the spray nozzles 15 and 18. As shown in FIG. 3, the nozzle 15 is advanced beyond the member 36 a slight distance, which is preferably 6 inches. However, it should be understood that the spray nozzle 15 could be disposed in alignment with the member 36 if desired. As previously mentioned, the nozzle 18 is preferably aligned with the nozzle 15.

The nozzles 16 and 19 are connected to the branch pipe 26 through a valve 42. When the valve 42 is opened, the cleaning solution flows from the pipe 26 through a hollow tube 43 to the nozzle 16 and from the tube 43 through a hollow tube 44 to the nozzle 19.

The valve 42 is controlled by a solenoid 45, which opens the valve 42 whenever the solenoid 45 is energized. The solenoid 45 is connected to the AC source 32 with one of the lines having a pneumatic switch 46 therein. Accordingly, the pneumatic switch 46 must be closed before the solenoid 45 can be energized. The pneumatic switch 46 is closed when a bellows 47 is compressed.

As previously described with respect to the pneumatic switch 33, the bellows 47 supplies only a single shot of compressed air to the pneumatic switch 46 through a pipe 47' so that the pneumatic switch 46 is energized for only a very short period of time. Thus, even if the bellows 47 remains compressed for a long period of time, it still can not supply any additional pressurized air to the pneumatic switch 46.

The bellows 47 is compressed whenever an activating or trip member 48, which is preferably a hollow pipe and has one end pivotally mounted to the channel 12 in the same manner as is the activating member 36, is moved downwardly by the wheels of the vehicle moving over the member 48 whereby the presence of the vehicle wheels is sensed. This results in the member 48 moving against the force of a spring 49, which has one end attached to the member 48 and its other end attached to the flange 40 of the channel 11. When the member 48 is moved downwardly by the vehicle wheels, a bracket 50, which is carried by the member 48, engages the bellows 47 and compresses the bellows 47. This energizes the solenoid 45 through closing the pneumatic switch 46 and allows the cleaning solution to be supplied through the nozzles 16 and 19. Because of the single shot of compressed air from the bellows 47 to the pneumatic switch 46, the valve 42 remains open only for a very short period of time such as one-tenth of a second, for example.

The nozzles 17 and 20 are connected to the branch pipe 27 through a valve 51, which is moved to an open position only when a solenoid 52 is energized. When the valve 51 is opened, the cleaning solution flows from the branch pipe 27 through a hollow tube 53 to the nozzle 17 and a hollow tube 54 to the nozzle 20.

The valve 51 is opened when the solenoid 52 is energized, The solenoid 52 is energized only when a pneumatic switch 55, which is disposed in one of the lines from the AC source 32 to the solenoid 52, is closed. This occurs only when a bellows 56, which is connected to the pneumatic sitch 55 by a pipe 57, is compressed.

The bellows 56 is compressed only when an activating or trip member 58 is engaged by the vehicle wheels moving thereover. The activating member 58, which is preferably a hollow pipe, is pivotally mounted on the channel 12 in the same manner as the activating members 36 and 48. The activating member 58 has its free end continuously urged upwardly by a spring 59, which has one end attached to the member 58 and its other end attached to the flange 40 of the channel 11.

When the wheels move the activating member 58 downwardly against the force of the spring 59 whereby the presence of the vehicle wheels is sensed, a bracket 60, which is carried by the activating member 58, engages the bellows 56 to compress the bellows 56. As a result, the bellows 56 supplies single shot of pressurized air to the pneumatic switch 55 to close the switch whereby the valve 51 is opened for a predetermined period of time such as one-tenth of a second, for example.

The tube 30 extends through the activating member 36, the tube 44 extends through the activating member 48, and the tube 54 extends through the activating member 58. This is the preferred means of providing communication to the nozzles 18–20, which are on the opposite side of the vehicle path from the nozzles 15–17. Of course, the tubes could be embedded within the road bed 10 if desired.

In order to prevent the cleaning solution from freezing within the tubes 29, 30, 43, 44, 53, and 54 when a low atmospheric temperature exists, it is necessary to insulate them in some suitable manner. This is preferably accomplished by utilizing a heat tube to form each of the tubes. The tube comprises a hollow tube having an electrical heating oil formed integral therewith. Of course, if desired, the cleaning solution could be maintained under a sufficiently high temperature to prevent the cleaning solution from freezing due to low atmospheric temperature and a protective heating means for each of the hollow tubes 29, 30, 43, 44, 53, and 54 would not be necessary.

Considering the operation of the present invention, a vehicle moves between the two channels 11 and 12 in the direction of the arrow 14. When at least one of the front wheels of the vehicle engages the activating or trip member 36, the spray nozzles 15 and 18 supply a predetermined quantity of the cleaning solution on a portion of the vehicle wheel. The spray nozzle 15 supplies the cleaning solution on the right front wheel of the vehicle while the spray nozzle 18 directs the cleaning solution on the left front wheel.

Even if the vehicle should stop with the front wheels resting on the activating member 36, the spray nozzles 15 and 18 supply only the predetermined quantity of the cleaning solution to the wheels. This is because the bellows 34 remains compressed due to the activating member 36 being engaged by the wheels and cannot supply any additional pressurized air to the pneumatic switch 33. Accordingly, the pneumatic switch 33 returns to an open position shortly after it is closed. Thus, the valve 28 is opened only for a very short period of time. This regulates the quantity of the cleaning solution that is supplied by each of the nozzles 15 and 18 to the front wheels.

As the vehicle progresses, the front wheels engage the activating member 48 whereby the predetermined quantity of the cleaning solution is supplied through each of the spray nozzles 16 and 19 to another portion of each of the front wheels of the vehicle. The nozzle 16 supplies the cleaning solution to the right front wheel while the spray nozzle 19 directs the cleaning solution to the left front vehicle.

As previously mentioned with respect to the activating member 36, the continued presence of the front wheels on the activating member 48 due to the vehicle not advancing further after the wheels engage the member 48 will not cause any additional cleaning solution to be supplied through the nozzles 16 and 19. This is because the bellows 47 supplies only the single shot of pressurized air to the pneumatic switch 46 even though the bellows 47 remains compressed due to the activating member 48 being engaged by the front wheels of the vehicle. Thus, the pneumatic switch 46 is only energized for the short period of time that the bellows 47 supplies the single shot of pressurized air to the pneumatic switch 46.

Continued movement of the vehicle along its path results in the front wheel engaging the activating or trip member 58. When this occurs, the bellows 56 is compressed and predetermined quantities of the cleaning solution are supplied through the spray nozzles 17 and 20. The spray nozzles 17 supplies the cleaning solution to the right front wheel while the spray nozzle 20 applies the cleaning solution to the left front wheel.

As previously mentioned with respect to the activating members 36, and 48, the nozzles 17 and 20 supply only the predetermined quantity of the cleaning solution on the front wheels even if the bellows 56 remains compressed due to the front wheels maintaining engagement with the activating member 58. Thus, the bellows 56 can not supply any additional pressurized air to the pneumatic switch 55 so that the pneumatic switch 55 again opens after the very short period of time during which it receives the pressurized air from the bellows 56 due to the compression of the bellows 56.

When the rear wheels of the vehicle engages the activating member 36, the same activation of the valve 28 to supply the cleaning solution to the nozzles 15 and 18 occurs. Likewise, when the rear wheels engage the activating member 48, the spray nozzles 16 and 19 supply a predetermined quantity of the cleaning solution to each of the rear wheels. Similarly, when the rear wheels engage the activating member 58, the nozzles 17 and 20 supply a predetermined quantity of the cleaning solution on the rear wheels.

After the vehicle exits from the wheel washing apparatus for the present invention, it may then proceed to an automatic vehicle washing apparatus in which water may be applied under pressure against the wheels of the vehicle. The time for advancement of the vehicle from the wheel washing apparatus of the present invention until the water is applied to the wheels is sufficient to allow the cleaning solution to set on the wheels to permit the cleaning solution to act on the grime on the wheels to permit the water to remove the grime therefrom.

Each of the pneumatic switches 33, 46, and 55 is preferably of the type having a diagram responsive to pressured air. The housing for the pneumatic switch has means to allow the pressurized air to escape therefrom so that continued pressurized air must be supplied to the pneumatic switch to maintain is closed and to hollow air to be supplied to the hollows after the bellows ceases to be compressed.

If desired, guard rails may be disposed to protect the spray nozzles 15–20 from being engaged by the vehicle wheels since such engagement might damage the spray nozzles. Accordingly, a guard rail 61 may be mounted on the channel 12 in spaced relation thereto to prevent the wheels on the left side of the vehicle from engaging the spray nozzles 18–20. Similarly, a guard rail 62 may be mounted on the channel 11 to protect the spray nozzles 15–17 from being engaged by the wheels on the right side of the vehicle.

While the present invention has shown and described each pair of aligned nozzles being controlled by a single activating member, it should be understood that each of the nozzles could have its own activating member. When this occurs, a separate valve is needed for each of the nozzles.

Likewise, it should be understood that the spray nozzles need not be aligned with each other. Furthermore, one set of the spray nozzles could be disposed to supply the wheel adjacent thereto before any of the cleaning solution is supplied to the wheel of the other side. This, of course, would require separate activating members for each of the nozzles.

While the activating members have been shown as resiliently biased members that are moved by engagement of the vehicle wheels therewith, any other means for sensing the presence of the wheel at a specific location may be employed. For example, photocells or air actuated hoses could be employed. The photocells would require different controls for the solenoids. It would be necessary to use a timing circuit with the photocells to de-energize each solenoid a predetermined time after it is activated.

While the pressurizing means for the cleaning solution has included a compressor and a tank maintained under pressure by the compressor 22, it should be understood that any other suitable means for supplying the cleaning solution under pressure through the nozzles 15–20 may be utilized. For example, any type of pump that would develop sufficient pressure could be employed.

It should be understood that any suitable cleaning solution may be employed. For example, the cleaning solution could be a mixture of a suitable vehicle wash detergent, bleach, ammonia, and lye.

An advantage of this invention is that precise metering of a cleaning solution for a vehicle wheel is obtained. Another advantage of this invention is that there is no waste of any cleaning solution. A further advantage of this invention is that no specific speed of the vehicle must be maintained.

For purposes of exemplification, a particular embodiment of the invention has been shown and described according to the best present understanding thereof. However, it will be apparent that changes and modifications in the arrangement and construction of the parts thereof may be restored to without departing from the spirit and scope of the invention.

I claim:

1. For use in an apparatus for automatically metering a predetermined quantity of cleaning solution on portions of a vehicle wheel in which said apparatus includes a plurality of linearly spaced means to sense the presence of a wheel of a vehicle at each of a plurality of linearly spaced positions along the path of the wheel of the vehicle, a plurality of linearly spaced supply means disposed on each side of the vehicle path with each of the supply means cooperating with one of the sensing means, means to control the supply of the cleaning solution to each of said supply means to supply a predetermined quantity of a cleaning solution therefrom when said sensing means senses the presence of the wheel, and each of said supply means and said cooperating sensing means being positioned relative to each other in the vehicle wheel path direction so that said supply means directs all of the predetermined quantity of the cleaning solution on a portion of the wheel having its presence sensed by said cooperating sensing means even when the wheels remains at the position at which said cooperating sensing means senses the presence of the wheel, a method of controlling the operation of said apparatus including:

sensing the position of the vehicle wheel at each of the linearly spaced positions by said sensing means;

starting the supply of cleaning solution from each of said supply means when said cooperating sensing means senses the presence of the vehicle wheel at the linearly spaced position; and stopping the supply of the cleaning solution from each of said supply means after the predetermined quantity of the cleaning solution has been supplied to the wheel even when said cooperating sensing means continues to sense the presence of the wheel due to the wheel not advancing from the position at which said cooperating sensing means senses its presence.

2. The method according to claim 1 including:

producing a signal when said sensing means senses the presence of the wheel at each of the linearly spaced positions; and starting the supply of the cleaning solution from each of said supply means in response to the signal produced when said cooperating sensing means senses the presence of the wheel.

3. The method according to claim 2 including starting the supply of the cleaning solution substantially instantaneous with sensing of the presence of the wheel by said cooperating sensing means.

4. The method according to claim 1 including:

activating a switch when said sensing means senses the presence of the wheel to start the supply of the cleaning solution from said supply means; and deactivating the switch after the predetermined quantity of the cleaning solution has been supplied to the wheel to stop the supply of the cleaning solution from said supply means.

5. The method according to claim 4 including starting the supply of the cleaning solution substantially instantaneous with sensing of the presence of the wheel by said cooperating sensing means.

6. The method according to claim 2 including producing a pneumatic signal when said sensing means senses the presence of the wheel at each of the linearly spaced positions.

7. The method according to claim 6 including starting the supply of the cleaning solution substantially instantaneous with sensing of the presence of the wheel by said cooperating sensing means.

8. The method according to claim 6 including activating a pneumatic switch in response to the pneumatic signal to start the supply of the cleaning solution.

9. The method according to claim 8 including starting the supply of the cleaning solution substantially instantaneous with sensing of the presence of the wheel by said cooperating sensing means.

10. For use an apparatus for automatically metering a predetermined maximum quantity of a cleaning solution on portions of a vehicle wheel in which said apparatus includes a plurality of linearly spaced means disposed along the path of a wheel of a vehicle for engagement by the wheel of the vehicle, a plurality of linearly spaced supply means disposed on each side of the vehicle path with each of the engaged means cooperating with one of the supply means on at least one side of the vehicle path, and each of said supply means and said cooperating engaged means being positioned relative to each other in the vehicle wheel path direction so that said supply means directs all of the supplied cleaning solution no greater than the predetermined maximum on a portion of the wheel engaging said cooperating engaged means even when the wheel remains at the position at which the wheel engages said cooperating engaged means, a method of controlling the operation of said apparatus including:

starting the supply of the cleaning solution from said supply means due to said cooperating engaged means being engaged by the vehicle wheel;

directing the supply of the cleaning solution from said supply means so that all of the supplied cleaning solution is directed on a portion of the wheel even when the wheel remains at the position at which said cooperating engaged means is engaged by the wheel; and stopping the supply of the cleaning solution from said supply means after a quantity of the cleaning solution no greater than the predetermined maximum has been supplied to the wheel even when said cooperating engaged means continues to be engaged by the wheel due to the wheel not advancing from the position at which said cooperating engaged means is engaged by the wheel.

* * * * *

UNITED STATES PATENT OFFICE
CERTIFICATE OF CORRECTION

Patent No. 3,660,159          Dated May 2, 1972

Inventor(s) Clyde F. Larkin, Jr.

It is certified that error appears in the above-identified patent and that said Letters Patent are hereby corrected as shown below:

Column 1, line 8, "it" should read -- is -- ; line 11, "satisfactorily" should read -- satisfactory -- ; line 18, "apparatus" should read -- apparatuses -- ; line 60, "satisfactorily" should read -- satisfactory -- . Column 2, line 33, after "invention", insert a comma -- , -- ; line 53, after "other", insert a comma -- , -- . Column 3, line 16, "29" should read -- 28 -- ; line 54, "14" should read -- 41 -- . Column 4, line 38, the comma (,)" should be a period -- . -- ; line 59, after "plies", insert -- a -- ; line 75, "oil" should read -- coil -- . Column 5, line 35, "vehicle" should read -- wheel -- ; line 57, after "36", cancel the comma "(,)". Column 6, line 1, "for" should read -- of -- ; line 12, "diagram" should read -- diaphragm -- ; line 15, "is" should read -- it -- ; line 16, "hollow" should read -- allow -- ; same line, "hollows" should read -- bellows -- . Column 7, line 13, "wheels" should read -- wheel -- . Column 8, line 18, after "use", insert -- in -- .

Signed and sealed this 26th day of December 1972.

(SEAL)
Attest:

EDWARD M. FLETCHER, JR.                ROBERT GOTTSCHALK
Attesting Officer                      Commissioner of Patents